United States Patent
Skinner

(10) Patent No.: US 9,362,831 B2
(45) Date of Patent: Jun. 7, 2016

(54) FLY-FORWARD CONVERTER WITH ENERGY RECOVERY SNUBBER

(71) Applicant: TDK-Lambda UK Limited, Ilfracombe (GB)

(72) Inventor: Andrew John Skinner, Woolacombe (GB)

(73) Assignee: TDK-Lambda UK Limited, Ilfracombe (GB)

(*) Notice: Subject to any disclaimer, the term of this patent is extended or adjusted under 35 U.S.C. 154(b) by 0 days.

(21) Appl. No.: 14/150,344

(22) Filed: Jan. 8, 2014

(65) Prior Publication Data
US 2014/0204620 A1    Jul. 24, 2014

(30) Foreign Application Priority Data
Jan. 22, 2013 (GB) ................... 1301075.6

(51) Int. Cl.
*H02M 3/335* (2006.01)
*H02M 3/156* (2006.01)

(52) U.S. Cl.
CPC .......... *H02M 3/33507* (2013.01); *H02M 3/156* (2013.01)

(58) Field of Classification Search
CPC ...................... H02M 3/33507; H02M 3/33561; H02M 3/3353; H02M 3/156
USPC .............. 363/21.16, 21.12, 56.12, 16, 71, 97, 363/131
See application file for complete search history.

(56) References Cited

U.S. PATENT DOCUMENTS

| | | | |
|---|---|---|---|
| 4,130,862 A | 12/1978 | Holt | |
| 5,694,303 A | 12/1997 | Silberkleit et al. | |
| 6,314,002 B1 * | 11/2001 | Qian et al. | 363/21.04 |
| 6,421,255 B1 | 7/2002 | Frebel et al. | |
| 6,473,318 B1 | 10/2002 | Qian et al. | |
| 6,798,670 B2 * | 9/2004 | King | H02J 7/0054 363/17 |
| 7,061,778 B2 | 6/2006 | Odell et al. | |
| 7,403,402 B2 * | 7/2008 | Odell et al. | 363/21.01 |
| 8,009,448 B2 | 8/2011 | Liu | |
| 8,498,134 B2 * | 7/2013 | Pollak | H02M 1/36 363/131 |
| 2004/0085050 A1 | 5/2004 | Jinno | |

(Continued)

FOREIGN PATENT DOCUMENTS

EP    0977346 A1    2/2000
EP    1605576 A1    12/2005

(Continued)

*Primary Examiner* — Jessica Han
*Assistant Examiner* — Lorena Bruner
(74) *Attorney, Agent, or Firm* — The Webb Law Firm

(57) ABSTRACT

A converter for transferring energy from a voltage supply to an output includes transformer T1, coupled inductor L1, switch S1, energy recovery capacitor C, and energy recovery winding T1b. Secondary winding T1c transfers energy from the supply to the output when primary winding T1a is connected to the voltage supply. Secondary winding L1b stores energy from the supply when primary winding L1a is connected to the supply, and transfers energy to the output when the primary winding is disconnected from the supply. Switch S1 switches between an on-state with windings T1a, L1a connected to the supply, and an off-state with windings T1a, L1a disconnected from the supply. Capacitor Cs provides a current path between the supply and windings T1a, L1a such that, in the off-state, energy associated with demagnetization and leakage inductance of transformer T1 is transferred to and stored in capacitor Cs.

18 Claims, 6 Drawing Sheets

(56) References Cited

U.S. PATENT DOCUMENTS

| | | | |
|---|---|---|---|
| 2008/0309305 A1* | 12/2008 | Atmur | H01S 5/042 323/301 |
| 2009/0196075 A1 | 8/2009 | Arduini | |
| 2009/0225574 A1 | 9/2009 | Fornage | |
| 2012/0170328 A1* | 7/2012 | Beasley | 363/21.12 |
| 2013/0343098 A1 | 12/2013 | Kern et al. | |

FOREIGN PATENT DOCUMENTS

| | | |
|---|---|---|
| GB | 2509982 A | 7/2014 |
| JP | 823676 A | 1/1996 |
| WO | 2014120153 A1 | 7/2014 |

* cited by examiner

FLY-FORWARD CONVERTER WITH ENERGY RECOVERY SNUBBER

CROSS-REFERENCE TO RELATED APPLICATION

This application claims priority to United Kingdom Application No. 1301075.6 filed Jan. 22, 2013, the disclosure of which is hereby incorporated by reference in its entirety.

BACKGROUND OF THE INVENTION

1. Field of the Invention

The present invention relates to a converter, and more particularly to a fly-forward converter with an energy recovery snubber.

2. Description of Related Art

The isolated flyback converter topology is widely used for switch mode power supplies (SMPS) due to its low parts count and simplicity. The basic topology is shown in FIG. 1. The converter comprises a coupled inductor L, which has a primary winding La and a secondary winding Lb for each output. A switch S, typically a metal oxide semiconductor field effect transistor (MOSFET), is provided for periodically connecting the primary winding to an input voltage. The/each secondary winding is connected via a diode D to an output capacitor C.

FIG. 2 shows typical current waveforms for the circuit illustrated in FIG. 1. When switch S is closed, current flows in the primary winding. This induces a voltage across the secondary winding which reverse biases the diode. Thus, no current flows in the secondary winding and energy is stored in the primary winding. When switch S is opened, the current in the primary winding drops rapidly, inducing a voltage across the secondary winding which forward biases the diode, so that current flows in the secondary winding until the energy stored in the inductor while switch S1 was closed is transferred.

As can be seen from FIG. 2, there is a commutation interval immediately after switch S is opened, during which some current flows in both windings. While this commutation of current from the primary winding to the secondary winding takes place, the primary current has to be given an alternative path in which to flow, in order to protect the switch.

This alternative path may take the form of a dissipative snubber. However, such snubbers reduce the power conversion efficiency. For example, for a 100W design, a dissipative snubber will reduce power conversion efficiency by between 1 and 3%.

Alternatively, an energy recovery snubber circuit may be provided, which recovers most of the energy back to the supply for delivery to the load in a subsequent switching cycle. U.S. Pat. No. 4,130,862 describes a circuit which uses an additional winding coupled to the inductor to achieve this. However, in this approach, the peak voltage seen by the switching MOSFET becomes limited to a defined multiple of the input voltage (2× in this case).

In addition to the above issues, a further drawback of the flyback converter is that power is only transferred to the secondary circuit when the switch is open. The highly discontinuous waveform leads to high RMS currents in the output capacitor which must supply the full output current while the switch is conducting.

FIG. 3 illustrates a so-called "fly-forward" converter topology, in which the functionality of the flyback converter topology is combined with that of a forward converter topology. The fly-forward converter significantly reduces the current stress in the output capacitor, as compared with a flyback converter.

The fly-forward converter resembles a flyback converter, with the addition of a transformer T. Transformer T has a primary winding Ta and a secondary winding Tb for each output. The primary winding T1$a$ of the transformer is connected in series with the primary winding La of the coupled inductor. The/each secondary winding of the transformer is connected via an additional diode $D_T$ to the output capacitor C.

When switch S is closed, current flows in both primary windings La and Ta. The voltage induced in Tb causes current to flow to the output capacitor when the switch is closed, whereas the coupled inductor L transfers energy to the output capacitor when switch S is subsequently opened, as described above for the flyback converter.

FIG. 4 shows typical current waveforms for the circuit illustrated in FIG. 3. For the purposes of illustration, a turns ratio which is not 1/1 is assumed so that the current through T1$b$ can be distinguished from the primary current. It can be seen that current flows in the secondary circuit while the switch is both on and off, and can, with appropriate component selection, be made to flow continuously. This lowers the losses and current stress in the secondary circuit considerably.

A drawback associated with the fly-forward converter topology is that the magnetising energy stored in T1 while switch S1 is closed must be dissipated in a snubber, or recovered using an additional circuit.

In the TDK Lambda p-series, an active-clamp power stage is used to enable energy recovery. However, this is a relatively high cost solution which requires 2 power MOSFETs. In JP 8,023,676, a resonant-reset capacitor is used to recover the magnetising energy stored in T1. However, some of the energy recovered by the resonant-reset capacitor is dissipated when the MOSFET switches on. Moreover, the resonant-reset capacitor will typically result in a higher off-state voltage for the MOSFET, which leads to higher on-state losses.

It is an object of the present invention to overcome the problems associated with the prior art.

SUMMARY OF THE INVENTION

According to the present invention there is provided a converter for transferring energy from a voltage supply to an output, the converter comprising:—
- a first inductive component T1 having a primary winding T1$a$ and a secondary winding T1$c$, connected to transfer energy from the voltage supply to the output when the primary winding is connected to the voltage supply;
- a second inductive component L1 having a primary winding L1$a$ and a secondary winding L1$b$ connected to store energy from the voltage supply when the primary winding is connected to the voltage supply and to transfer the stored energy to the output when the primary winding is subsequently disconnected from the voltage supply;
- a switch S1 for periodically switching between an on-state in which the primary windings T1$a$, L1$a$ of the first and second inductive components are connected to the voltage supply, and an off-state in which the primary windings are disconnected from the voltage supply;
- an energy recovery capacitor Cs connected to provide a current path between the voltage supply and the primary windings T1$a$, L1$a$ such that, during the off-state, energy associated with demagnetization of the first inductive component T1 and energy associated with leakage inductance of the first inductive components T1 is, at least in part, transferred to and stored in capacitor Cs; and an energy recovery winding T1b inductively coupled to the secondary winding T1c of the first inductive component T1, and electrically connected during the on-state, such that energy stored in capacitor Cs during the off-state is, at least in part, transferred to the output via winding T1c during the on-state.

Preferably, capacitor Cs is connected to provide a current path between the voltage supply and the primary windings T1a, L1a such that, during the off-state, energy associated with demagnetization of the first inductive component T1 and energy associated with leakage inductance of the first and second inductive components T1, L1 is, at least in part, transferred to and stored in capacitor Cs.

The two inductive components T1, L1 and the switch S1 form a fly-forward converter. That is to say, the first inductive component operates in the manner of a transformer in a forward converter while the second inductive component operates in the manner of a transformer/coupled inductor in a fly-back converter.

The energy recovery capacitor Cs and the energy recovery winding T1b form an energy recovery snubber which allows energy associated with demagnetization of the first inductive component T1, leakage inductance associated with the first inductive component T1 and, preferably, energy associated with leakage inductance of the second inductive component to be recovered.

When switch S1 switches from the on-state to the off-state, current flowing in winding T1a, and preferably winding L1a, due to these effects passes back to the voltage supply via capacitor Cs. This has the effect of charging the capacitor Cs.

Initially, energy is transferred back to the voltage supply. However, once the voltage V(Cs) across capacitor Cs exceeds a voltage V(T1b), which is the voltage across the energy recovery winding V(T1b) in the on-state, energy is transferred to the output during the on-state. Capacitor Cs may be charged over several switching cycles until the voltage across the capacitor Cs reaches this level.

In this respect, during the on-state, the voltage V(T1b) across energy recovery winding T1b, is determined by the output voltage of the converter V(out) and the turns ratio between winding T1b and winding T1c, according to V(T1b)=Vout*T1b/T1c, where T1b/T1c is the number of turns on T1b divided by the number of turns on T1c.

In the on-state, capacitor Cs and winding T1b are connected together such that, while V(Cs) exceeds V(T1b), current will flow in winding T1b. This will, in turn, cause current to flow in secondary winding T1c with which it is inductively coupled. In effect, the leakage inductance of inductively coupled windings T1b and T1c forms a resonant circuit with capacitor Cs during the on-state. This maintains the voltage across Cs at an approximately fixed voltage of Vout*T1b/T1c. The result is an additional current with a resonant waveform in winding T1c during the on-state. Thus, energy stored by the capacitor Cs during the off-state is transferred to the output via winding T1c during the on-state.

One plate of capacitor Cs may be connected to a connection point at any point along winding L1a. Preferably, the connection point is at the opposite end of winding L1a to the end connected to winding T1a. In this case, substantially all of the energy associated with the leakage inductance of L1 may be transferred to the capacitor Cs during the off-state. Alternatively, the connection point may be located part way along winding L1a. In this case, a proportion of the energy associated with the leakage inductance of L1 may be transferred to the capacitor Cs during the off-state. In one embodiment, the connection point may be at the end of winding L1a connected to winding T1a. In this case, energy associated with the leakage inductance of L1 will not be recovered. Capacitor Cs may be connected to winding L1a by means of a winding tap.

Preferably, winding T1b is connected to form a resonant circuit with capacitor Cs in the on-state.

Preferably, in the on-state, V(T1b)=Vout*T1b/T1c, where T1b/T1c is the number of turns on T1b divided by the number of turns on T1c.

Preferably, the voltage V(Cs) across capacitor Cs is, after an initialization period, substantially constant and given by $$V(Cs)=Vout*T1b/T1c \quad (4)$$

where T1b/T1c is the number of turns on T1b divided by the number of turns on T1c.

Preferably, the turns ratio T1b/T1c is selected such that V(Cs) as determined by equation (4) is at least 100V±10%. Preferably, the turns ratio T1b/T1c is selected such that V(Cs) as determined by equation (4) is up to 150V±10%. For a universal input, single-phase power supply, this range allows for the use of low RdsON super-junction MOSFETS. For a three phase power supply, the voltages would be proportionally higher.

Preferably, the turns ratio T1b/T1c is selected such that V(Cs) as determined by equation (4) is at least 1.5*Vout*N, where N is the turns ratio L1a/L1b=T1a/T1c and Vout is the output voltage of the converter for the respective output. Preferably, the turns ratio T1b/T1c is up to 2.5*Vout*N. This range gives a reasonable compromise between voltage stress on the MOSFET and operating duty cycle.

Preferably, the turns ratio L1a/L1b is substantially equal to the turns ratio T1a/T1c.

Preferably, the turns ratio L1a/L1b=T1a/T1c=N is selected according to $$Vout*N/(V(Cs)-Vout*N)<(Vin-Vout*N)/(Vout*N) \quad (3)$$

where Vout is the output voltage of the converter (for the respective output), V(Cs) is the voltage across capacitor Cs, and Vin is the minimum required input voltage.

Preferably, the inductance of winding T1a is greater than that of winding L1a. More preferably, the inductance of winding T1a is at least 5 times greater than that of winding L1a. More preferably, the inductance of winding T1a is at least 10 times greater than that of winding L1a. The inductance of winding T1a is preferably up to 30 times greater than the inductance of winding L1a.

Preferably, winding T1a is selected to demagnetize before winding L1a during the off-state.

This allows for an additional winding on the second inductive component for detecting magnetization. This in turn allows for the use of control ICs designed for quasi-resonant flyback topologies.

Preferably, a rectifier D1 is connected between capacitor Cs and the voltage supply, oriented to allow current flow in a direction corresponding to the transfer of energy from the primary windings T1a and L1a to the capacitor Cs, and to substantially block current flow in the opposite direction.

Preferably, a rectifier D2 is connected between capacitor Cs and winding T1b, oriented to allow current flow in winding T1b when the voltage across Cs exceeds the voltage across winding T1b, and to substantially block current flow in the opposite direction.

Preferably, winding T1b and rectifiers D1 and D2 are connected in series, rectifiers D1 and D2 being oriented to allow current flow such that energy associated with current flow in winding T1b during the off-state passes back to the supply.

Preferably, winding T1c is connected to the output via a rectifier D3, wherein rectifier D3 is oriented to allow current flow in winding T1c when the primary winding T1a is connected to the voltage supply, and to substantially block current flow in the opposite direction.

Further preferably, secondary winding L1b is connected to the output via a rectifier D4, wherein rectifier D4 is oriented to substantially block current flow in winding L1b when the primary winding L1a is connected to the voltage supply, and to allow current flow in the opposite direction. Thus, the second inductive component L1 stores energy during the on-state, which is releases as current flow in the secondary winding L1b when the primary winding L1a is subsequently disconnected from the voltage supply.

The output preferably comprises a common output capacitor Cout. The output voltage Vout of the converter is preferably the voltage across Cout. Switch S1 is preferably a MOSFET.

The term rectifier refers to an electrical device that allows current to flow through it in one direction only. Preferably, the or each rectifier takes the form of a single diode. In particular, a synchronous rectifier may be used for either or both of rectifiers D3 and D4.

For the avoidance of doubt, when components are described as connected to a voltage supply, this means that the voltage supply creates a voltage V or potential difference between two points in the circuit (or, equivalently, between two rails of the circuit), and the component(s) are electrically connected between those points such that the voltage V is applied across the component(s) connected therebetween. Multiple components may be simultaneously connected to a voltage supply in series or in parallel. In the present case, the primary windings T1a, L1a of the first and second inductive components are preferably connected to one another in series.

Where components are described as connected to other components, electrical connection should be assumed, unless otherwise stated. Components described as connected may be directly connected together, or additional component(s) may be connected therebetween.

It will be appreciated that the converter may have multiple outputs. In general, the converter may be configured for transferring energy from a voltage supply to n outputs, where n is an integer value greater than or equal to 1. For at least one of the n outputs, the inductive components T1, L1 each comprise a respective secondary winding for supplying the respective output. For any further outputs, one or both of the inductive components T1, L1 each comprise a respective secondary winding for supplying the respective output.

The converter preferably comprises n output capacitors Cout, Cout2, . . . , one output capacitor being associated with each of the n outputs.

BRIEF DESCRIPTION OF THE DRAWINGS

The present invention will now be described with reference to the accompanying drawings in which:—

DESCRIPTION OF THE INVENTION

Figure 1:
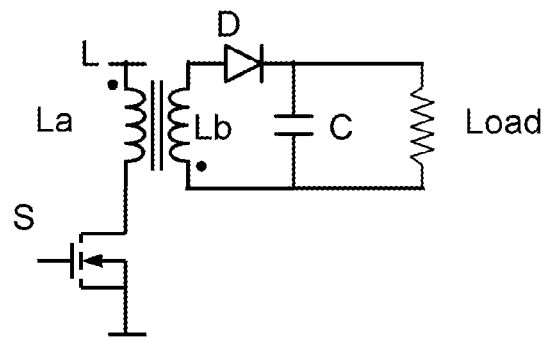
FIG. 1 shows a flyback converter topology.
Figure 2:
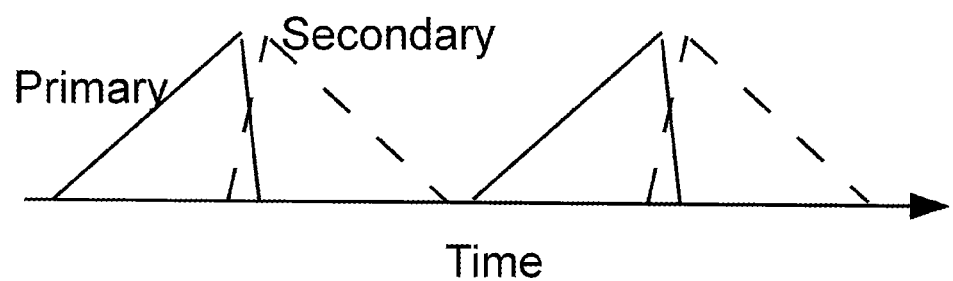
FIG. 2 shows typical current waveforms for the circuit of FIG. 1 for discontinuous mode operation.
Figure 3:
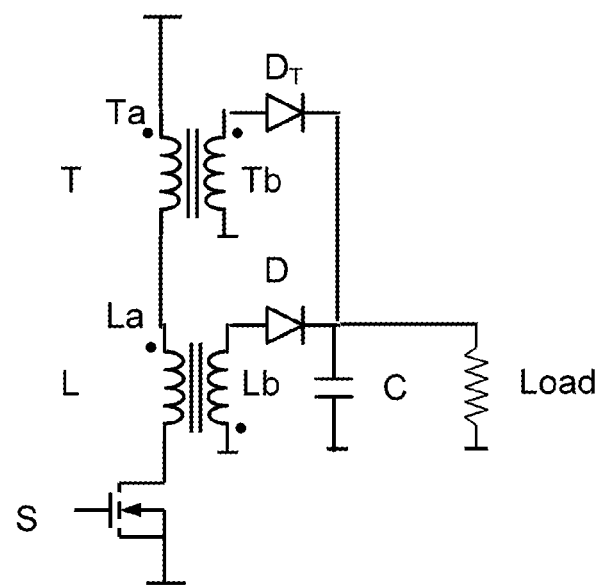
FIG. 3 shows a fly-forward converter topology.
Figure 4:
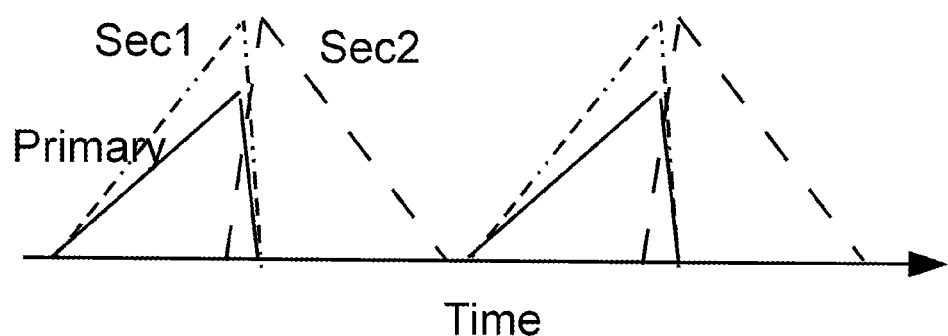
FIG. 4 shows typical current waveforms for the circuit of FIG. 2.

Components common to the different embodiments are labelled using the same reference numerals in relation to each embodiment.

In the specification, the notation A/B means the (number of turns of A)/(number of turns of B).

Figure 5:
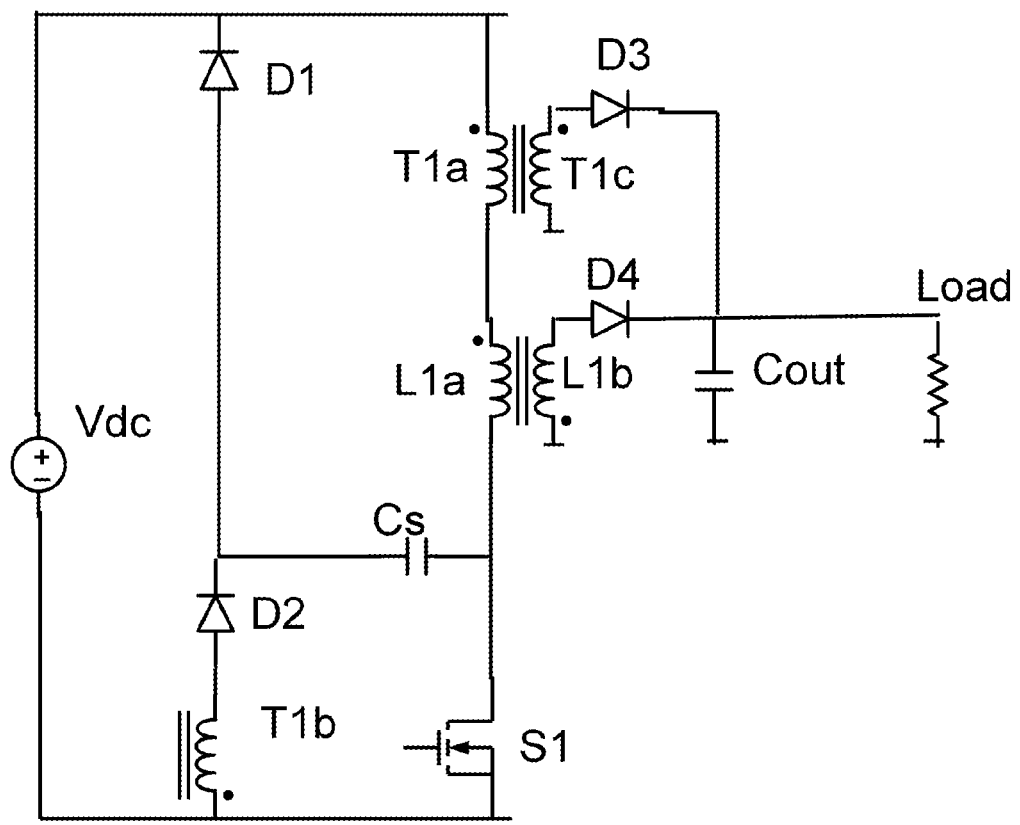
FIG. 5 shows a fly forward converter with an energy recovery snubber according to a first embodiment of the present invention.

FIG. 5 shows a fly forward converter topology with an energy recovery snubber according to a first embodiment of the present invention.

The fly-forward converter comprises a transformer T1 and a coupled inductor L1, The transformer and the coupled inductor each have a primary winding T1a, L1a which are connected to one another in series. A switch S1, typically a MOSFET, is provided for periodically connecting the series connected primary windings T1a, L1a between high and low voltage rails supplied by a dc voltage supply Vdc. In this respect, the supply Vdc supplies an input voltage Vin between a high voltage rail and a low voltage rail of the circuit. One end of T1a is connected to the high voltage rail, and its other end is connected to one end of L1a. Switch S1 is connected between the other end of L1a and the low voltage rail, such that closing the switch completes the circuit and opening the switch breaks the circuit. In this way, the circuit is switched between an on-state in which the primary windings are connected to the supply and an off-state in which the primary windings are disconnected from the supply. It will be appreciated that switch S1 may alternatively be referenced to the other side of the supply.

Transformer T1 has a secondary winding T1c. One end of T1c is connected to the anode of a first output diode D3. The cathode of D3 is connected to a first plate of an output capacitor Cout. A second plate of Cout is connected to the other end of T1c. Winding T1c is oriented relative to the primary winding T1a and diode D3 such that the voltage induced by current flow in T1a when switch S1 is closed forward biases diode D3.

The coupled inductor L1 has a secondary winding L1b. One end of L1b is connected to the anode of a second output diode D4. The cathode of D4 is also connected to the first plate of output capacitor Cout. The second plate of Cout is connected to the second terminal of L1b. Winding L1b is oriented relative to the primary winding L1a and diode D4 such that the voltage induced by current flow in L1a when switch S1 is closed reverse biases diode D4, and such that the voltage induced when S1 is subsequently opened forward biases diode D4.

The energy recovery snubber comprises a further winding T1b of the transformer T1, two diodes D1 and D2, and a snubber capacitor Cs.

One plate of the snubber capacitor Cs is connected to a node in the circuit between winding L1a and switch S1. The other plate of capacitor Cs is connected to the cathode of diode D2 and to the anode of diode D1. The anode of diode D2 is connected to one end of winding T1b, whose other end is connected to the low voltage rail supplied by the voltage supply. The cathode of diode D1 is connected to the high voltage rail supplied by the voltage supply.

Winding T1b is oriented relative to winding T1c and diode D3 such that current flow in T1b causes current flow in T1c.

Operation of the circuit in boundary conduction mode is described below.

Switch S1 is operated with a periodic switching cycle which contains 2 states. Namely, an on-state (time interval 1) in which S1 is closed (conducting), and an off-state (time interval 2) in which S1 is open (non-conducting).

Time Interval 1

During time interval 1, the voltage across winding T1a is determined by the output voltage Vout and the turns ratio between windings T1a and T1c, according to V(T1a)=(T1a/T1c)* Vout. Thus, the voltage across T1a is substantially constant and proportional to the output voltage Vout. The voltage across winding L1a is equal to the input voltage Vin minus the voltage across T1a. As a result, the magnetising current in L1a ramps up (increases linearly) from zero.

The voltage across winding T1b is determined by the output voltage Vout and the turns ratio between windings T1b and T1c according to V(T1b)=(T1b/T1c)*Vout. During time interval 1, if the voltage across snubber capacitor Cs is greater than the voltage across winding T1b, diode D2 will be forward biased and current will flow in T1b. Otherwise, the current in T1b will be substantially zero. Thus, current flow in winding T1b will have a resonant waveform with a characteristic determined by the leakage inductance between the transformer windings T1b and T1c, and by capacitor Cs.

During time interval 1, the current in T1c is determined by the current flowing in windings T1a and T1b, and will substantially cancel the ampere-turns (current multiplied by the number of turns for the winding) flowing in these two windings. T1 and L1 are selected such that the turns ratio T1c/T1a is the same as L1b/L1a, while the ampere-turns in T1b is significantly lower than that in T1a. Thus, the current in T1c rises as a linear ramp plus a small sinusoidal current which represents energy recovered from the snubber capacitor Cs.

During time interval 1, the current in L1b is substantially zero.

In steady state, capacitor Cs ends time interval 1 charged to a voltage of approximately V(Cs)=(T1b/T1c)*Vout.

Time Interval 2

Time interval 2 can be split into 4 contiguous parts: 2.1, 2.2, 2.3, and 2.4.

During time interval 2.1, current commutates from diode D3 to D4 as follows. S1 switches to the off-state at the start of time interval 2.1. Due to the energy stored in the magnetising and leakage inductances of T1 and L1, current will initially continue to flow in T1a and L1a. This current flows back to the supply on the high voltage rail via the snubber capacitor Cs and diode D1. If the current in T1b is non-zero at the start of time interval 2.1, the current in this winding will flow back to the supply on the high voltage rail via diodes D2 and D1.

During time interval 2.1, current ramps down in diode D3 and simultaneously ramps up in diode D4 at a finite rate limited by the leakage inductances of T1 and L1. The energy stored in this inductance is transferred to capacitor Cs during time interval 2.1.

If current is still flowing in winding T1b at the start of time interval 2.1, this current will also ramp down to zero during this time interval.

At the end of time interval 2.1, the current in diode D2 is zero, and the output is supplied by energy stored in inductor L1 during time interval 1 via diode D4.

During time interval 2.2, a small current continues to flow in T1a. This represents the decaying magnetising energy of transformer T1. T1 demagnetises at a rate determined by the voltage on capacitor Cs and the reflected voltage on L1a. T1 is selected to demagnetise before the end of time interval 2. Diode D1 remains forward biased while current decays in T1a.

During time interval 2.2, L1 demagnetises at a rate determined by the output voltage Vout (determined by the turns ratio between L1a and L1b) and the inductance of L1b.

Time interval 2.2 ends once T1 has demagnetised and current falls to zero in diode D1 and it becomes reverse biased. At this point, the snubber capacitor Cs is charged to its maximum voltage, since the energy stored in the magnetising and leakage inductances of T1 and L1a has transferred to Cs. The energy stored by capacitor Cs is transferred to the load during time interval 1, as described above, rather than being dissipated or passed back to the supply.

During time interval 2.3, the only significant current is that flowing in L1b and diode D4, which flows to the load. L1 continues to demagnetise. During this time interval T1a resonates with parasitic capacitances, causing an insignificant amount of current to flow in T1a and L1a.

L1 is selected such that the current in L1b will fall to zero before the end of time interval 2. Time interval 2.3 ends once the current in L1b and diode D4 falls to zero.

During time interval 2.4, the voltage across L1b will start to reverse since there is no longer current flowing in diode D4. Switch S1 will be re-triggered into the on-state once the current in L1b falls to zero and diode D4 is reverse biased. This represents the end of time interval 2, whereupon time interval 1 is repeated.

Operation of a converter in boundary conduction mode is described above. However, inductor L1 may be operated in any of the known operating modes. Namely, continuous mode, boundary conduction mode (also known as critical conduction mode), or discontinuous mode.

For operation in continuous mode, time interval 2 would be terminated before the current in L1b has fallen to zero. For operation in discontinuous mode, a time delay would exist between the current falling to zero in 1b an S1 being triggered.

There follows an explanation of key parameter selection for a circuit which embodies the present invention.

For the purposes of this explanation, the following assumptions are made:— operation in boundary conduction mode that the inductance of T1a is significantly greater than that of L1a turns ratio L1a/L1b and T1a/T1c are the same, ie L1a/L1b=T1a/T1c=N the voltage on the snubber capacitor Cs is de T1a is selected to demagnetise before L1a so that an additional winding on L1 may be used for detection of magnetisation. This allows for the use of control ICs designed for quasi-resonant flyback topologies.

Ignoring second-order leakage inductance effects, the volt-second balance equations for L1a and T1a give:—

$$L1a: (Vin-Vout*N)*Ton=Vout*N*Toff \quad (1)$$

$$T1a: Vout*N*Ton=(V(Cs)-Vout*N)*Toff \quad (2)$$

where Vin is the input voltage, Vout is the output voltage, N is the turns ratio L1a/L1b=L1a/L1c, Ton is the duration of time interval 1 when switch S1 is on, Toff is time taken by the respective winding to demagnetise and V(Cs) is the voltage on capacitor Cs.

In order for T1a to demagnetise first, Toff in equation 2 must be shorter than that in equation 1. Thus:

$$Vout*N/(V(Cs)-Vout*N)<(Vin-Vout*N)/(Vout*N) \quad (3)$$

For ideal waveforms, the peak drain-source voltage for the MOSFET switch S1 will be Vdc+V(Cs), where Vdc is the input voltage. V(Cs) depends on the output voltage and the turns ratio T1b/T1c=N2, according to:

$$V(Cs) = N2 * Vout \quad (4)$$

V(Cs) will be selected based on the drain-source voltage of the MOSFET used. For a 650 or 700V MOSFET, it is desirable to limit V(Cs) to approximately 150V for a nominal 400V voltage supply.

Given V(Cs), a value of N can be selected that allows condition (3) to be satisfied at the minimum required input voltage Vin. For example, if Vout=24V, V(Cs)=150V and N=3, taking diode on-state voltage into account, Vout*N=75V, then condition (3) would be satisfied for Vin>150V. For the same voltages and N=3.5, condition (3) would be satisfied for Vin>210V.

A higher value of N will reduce the primary side current stress, but will also require a higher under-voltage lockout voltage and higher value input capacitor for a given hold-up time. Increasing V(Cs) allows for operation with a lower input voltage, but increases the voltage stress on the MOSFET.

The final choice of N and N2 depends on the ratings and cost of available MOSFETs. It is considered that, given currently available technology, 650 or 700V MOSFET will allow for the lowest cost and highest performance to be achieved.

Once N and N2 are selected, the inductance of L1a can be determined from the peak primary current Ipk. The output power Pout can be determined from Ipk.

$$Ipk = (Vin - Vout*N)*Ton/L1a \quad (5)$$

$$Pout = Vin*Ipk*Ton/(2*T) \quad (6)$$

$$Toff = Ipk*L1a/(Vout*N) \quad (7)$$

where T=Ton+Toff.

Rearranging equations (5), (6) and (7) and taking account of efficiency, η, gives:

$$Pout = \eta*(Vin - Vout*N)*(Vout*N)*Ton/(2*L1a) \quad (8)$$

From equation (8), the value of L1a can be determined given Ton.

Provided that the magnetising inductance of T1>>L1a, the inductance of T1 can be freely chosen. A lower value will result in higher values of circulating VA (volt-ampere). A small gap that stabilises the inductance of T1 is preferred. A lower value of magnetising inductance for T1 will increase the ripple voltage on Cs.

Cs may be selected according to various criteria. Preferably, however, the energy recovered from Cs via winding T1b is recovered resonantly at higher power levels. To achieve this, Cs is selected so that the resonant frequency of the leakage inductance between T1b and T1c and Cs has a half-period less than Ton at higher power levels. In this case, the current in T1b falls to zero before the end of the MOSFET on-time and does not contribute to MOSFET turn-off losses. If T1 has a very high leakage inductance, it may not be possible for the resonant frequency to have a half-period less than Ton, without Cs being too small and having a high ripple voltage. In this case, the value of Cs would be increased and additional turn-off losses in the MOSFET would need to be allowed for.

Equation (8) also shows that the output power Pout is proportional to Ton in boundary conduction mode. At light load operation, it would be necessary to limit the maximum frequency of operation, and operate in discontinuous mode.

Figure 6:
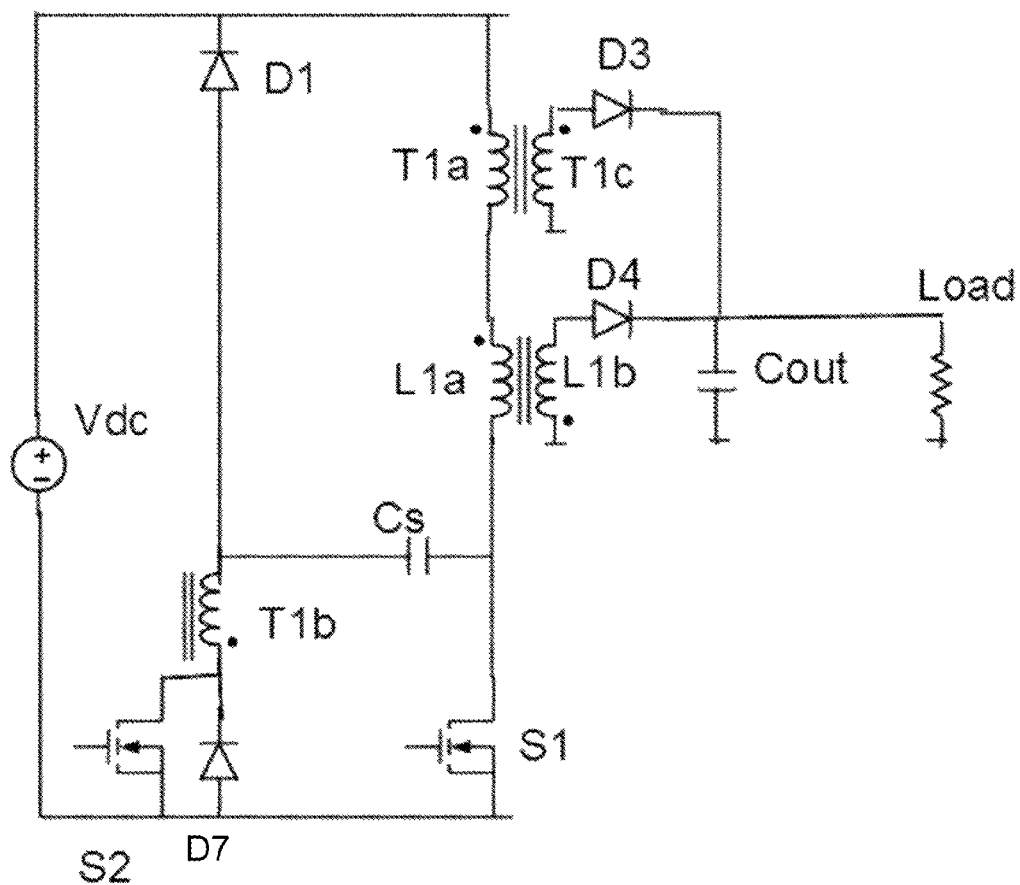
FIG. 6 shows a fly forward converter with an energy recovery snubber according to a second embodiment of the present invention.

FIG. 6 shows a fly forward converter with an energy recovery snubber according to a second embodiment of the present invention. The converter is similar to the converter shown in FIG. 5, except that diode D2 is replaced by a synchronous MOSFET rectifier. The MOSFET rectifier comprises a MOSFET switch S2 and a diode D7, which may be the parasitic diode of the MOSFET.

As in the first embodiment, one plate of the snubber capacitor Cs is connected to a node in the circuit between winding L1a and switch S1. The other plate of capacitor Cs is connected to one end of winding T1b. The other end of T1b is connected to the drain of MOSFET switch S2, while the source of. S2 is connected to the low voltage rail. Diode D7 is connected in parallel with the MOSFET switch, with its anode connected to the low voltage rail.

The synchronous MOSFET rectifier performs an equivalent role to diode D2 in the first embodiment. Thus, operation of the converter is substantially identical to that of the first embodiment.

Switch S2 may be switched synchronously with switch S1. This arrangement would reduce the conduction losses in D7.

Other aspects of the second embodiment are as described in relation to the first embodiment.

Figure 7:
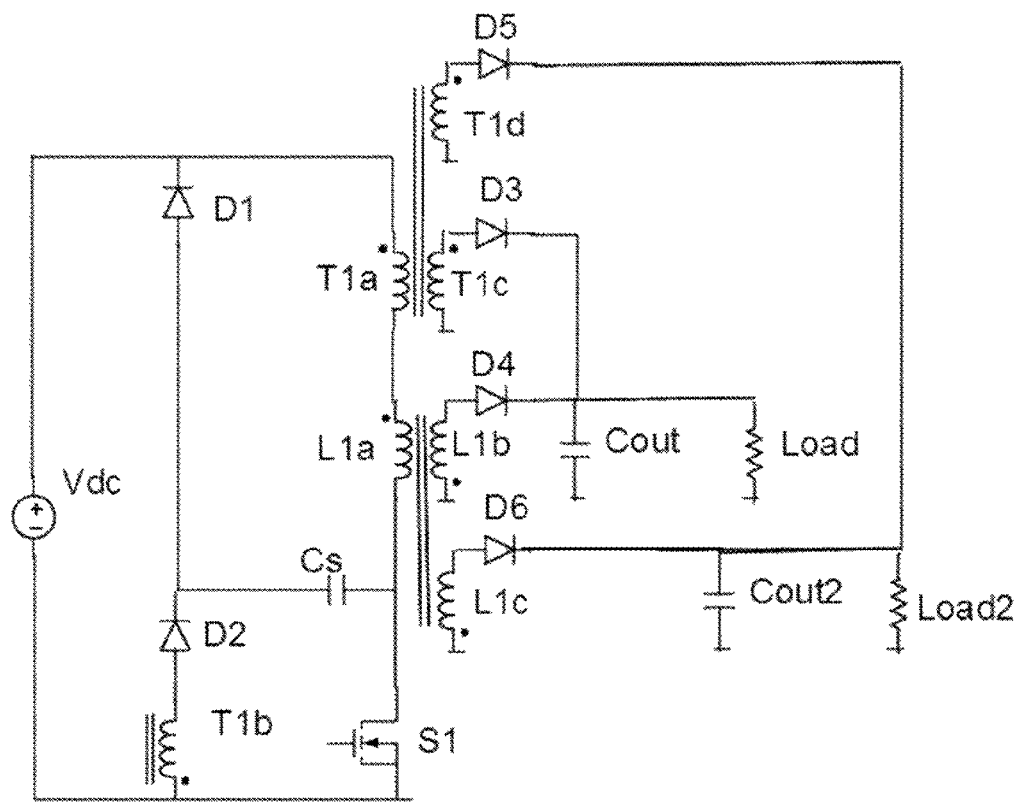
FIG. 7 shows a fly forward converter with an energy recovery snubber according to a third embodiment of the present invention.

FIG. 7 shows a multiple output version of the fly forward invention. The converter is similar to the converter shown in converter according to a third embodiment of the present FIG. 5, except that the transformer T1 and the coupled inductor L1 each comprise an additional secondary winding T1d, L1c inductively coupled to the respective primary windings T1a, L1a, for supplying a second output represented in FIG. 7 by Load2.

In this respect, one end of winding T1d is connected to the anode of an output diode D5. The cathode of D5 is connected to a first plate of a second output capacitor Cout2. A second plate of Cout2 is connected to the other end of T1d. Winding T1d is oriented relative to the primary winding T1a and diode D5 such that the voltage induced by current flow in T1a when switch S1 is closed forward biases diode D5.

One end of winding L1c is connected to the anode of an output diode D6. The cathode of D6 is also connected to the first plate of the second output capacitor Cout2. The second plate of Cout2 is connected to the second terminal of L1c. Winding L1c is oriented relative to the primary winding L1a and diode D6 such that the voltage induced by current flow in L1a when switch S1 is closed reverse biases diode D6, and such that the voltage induced when S1 is subsequently opened forward biases diode D6.

If the load associated with the second output Load2 is small (determined by the ripple current rating of Cout2), then either 11d and D5, or L1c and D6 could be omitted, and the circuit will still operate. Although a minimum load may be required on the first output to maintain good regulation.

It will be appreciated that additional outputs may be provided in a similar manner, within the scope of the present invention.

Other aspects of the third embodiment are as described in relation to the first or second embodiments.

Figure 8:
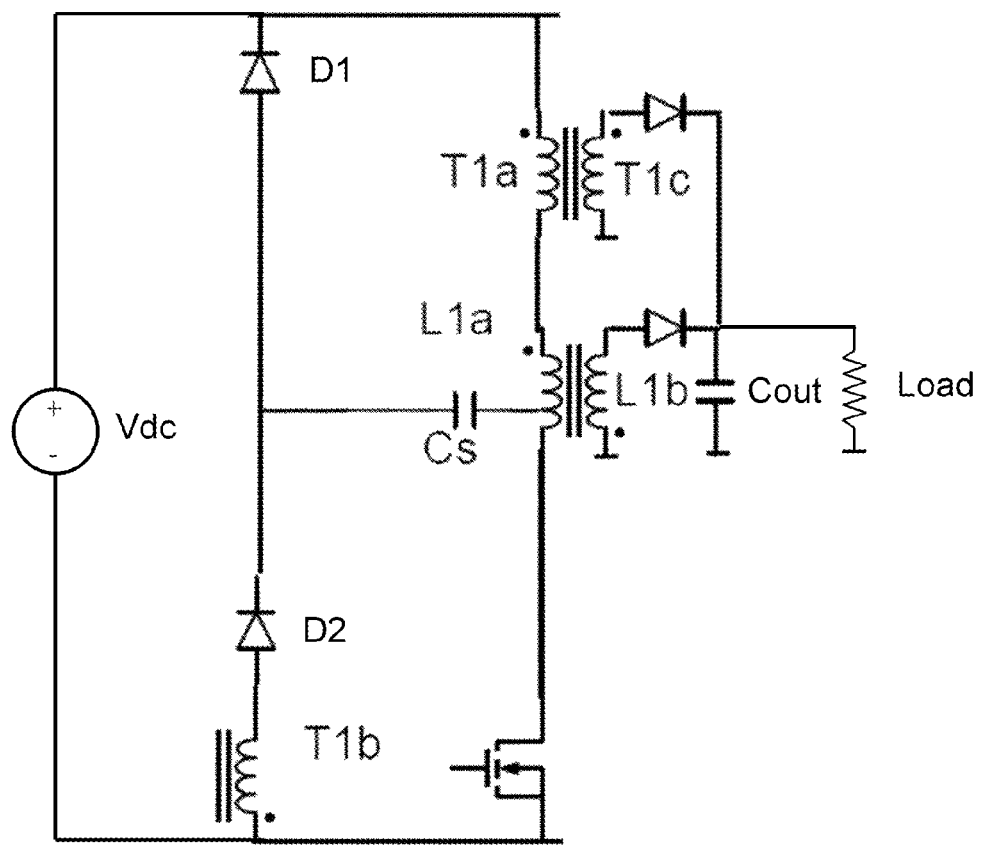
FIG. 8 shows a fly forward converter with an energy recovery snubber according to a fourth embodiment of the present invention.

FIG. 8 shows a fly forward converter with an energy recovery snubber according to a fourth embodiment of the present invention.

Capacitor Cs is connected to a winding tap located part way along winding L1a. Most of the energy associated with leakage inductance of L1 may be captured by tapping L1a in this way. The winding tap may be located at any point along winding L1a, including each end.

Other aspects of the fourth embodiment are as described in relation to the first, second or third embodiments.

In all embodiments, the output diodes D3, D4, D5 and D6 are described as connected in a particular orientation. It will be appreciated that for negative outputs, the orientation of the diodes would be reversed.

In all embodiments, winding T1b could be connected to capacitor Cs at any time during the on-state, for example, by means of a further switch. This would enable control or modulation of the voltage on Cs, or control of the conduction interval for current in Cs during the on-state.

The invention claimed is:

1. A converter for transferring energy from a voltage supply to one or more outputs, the converter comprising:
   a first inductive component T1 having a primary winding Ta and at least one secondary winding T1c, the secondary winding T1c being connected to transfer energy from the voltage supply to a respective output when the primary winding is connected to the voltage supply;
   a second inductive component L1 having a primary winding L1a and at least one secondary winding L1b, the secondary winding L1b being connected to store energy from the voltage supply when the primary winding is connected to the voltage supply and to transfer the stored energy to a respective output when the primary winding is subsequently disconnected from the voltage supply;
   a switch S1 for periodically switching between an on-state in which the primary windings T1a, L1a of the first and second inductive components are connected to the voltage supply, and an off-state in which the primary windings are disconnected from the voltage supply;
   an energy recovery capacitor Cs connected to provide a current path between the voltage supply and the primary windings T1a, L1a such that, during the off-state, energy associated with demagnetization of the first inductive component T1 and energy associated with leakage inductance of the first inductive component T1 is, at least in part, transferred to and stored in capacitor Cs; and
   an energy recovery winding T1b inductively coupled to the secondary winding T1c of the first inductive component T1, and electrically connected to capacitor Cs during the on-state, such that energy stored in capacitor Cs during the off-state is, at least in part, transferred to the output via the secondary winding T1c during the on-state wherein, in the on-state, V(T1b)=Vout*T1b/T1c, where T1b/T1c is the number of turns on T1b divided by the number of turns on T1c.

2. The converter as claimed in claim 1, wherein capacitor Cs is connected to provide a current path between the voltage supply and the primary windings T1a, L1a such that, during the off-state, energy associated with demagnetization of the first inductive component T1 and energy associated with leakage inductance of the first and second inductive components T1, L1 is, at least in part, transferred to and stored in capacitor Cs.

3. The converter as claimed in claim 1, wherein one plate of capacitor Cs is connected to a connection point located anywhere along winding L1a.

4. The converter as claimed in claim 1, wherein energy stored in capacitor Cs during the off-state is, at least in part, transferred to the output via winding T1c during the on-state, when voltage V(Cs) across capacitor Cs exceeds voltage V(T1b) across winding T1b.

5. The converter as claimed in claim 1, wherein the voltage V(Cs) across capacitor Cs is, after an initialization period, substantially constant and given by $$V(Cs)=Vout*T1b/T1c$$

where T1b/T1c is the number of turns on T1b divided by the number of turns on T1c.

6. The converter as claimed in claim 5, wherein the turns ratio T1b/Tc is selected such that said V(Cs) such that, after said initialization period, said V(Cs) is in the range of 100-150V.

7. The converter as claimed in claim 1, wherein the turns ratio L1a/L1b is substantially equal to the turns ratio T1a/T1c.

8. The converter as claimed in claim 7, wherein the turns ratio L1a/L1b=T1a/T1c=N is selected according to $$Vout*N/(V(Cs)-Vout*N)<(Vin-Vout*N)/(Vout*N)$$

where Vout is the output voltage of the converter, V(Cs) is the voltage across capacitor Cs, and Vin is the minimum required input voltage.

9. The converter as claimed in claim 1, wherein the inductance of winding T1a is greater than that of winding L1a.

10. The converter as claimed in claim 1, wherein winding T1a is selected to demagnetise before winding L1a during the off-state.

11. The converter as claimed in claim 1, wherein a rectifier D1 is connected between capacitor Cs and one rail of the voltage supply, oriented to allow current flow in a direction corresponding to the transfer of energy from the primary windings T1a and L1a to the capacitor Cs, and to substantially block current flow in the opposite direction.

12. The converter as claimed in claim 1, wherein a rectifier D2 is connected between capacitor Cs and winding T1b, oriented to allow current flow in winding T1b when the voltage across Cs exceeds the voltage across winding T1b, and to substantially block current flow in the opposite direction.

13. The converter as claimed in claim 11, wherein winding T1b and rectifiers D1 and D2 are connected in series, rectifiers D1 and D2 being oriented to allow current flow such that energy associated with current flow in winding T1b during the off-state passes back to the supply.

14. The converter as claimed in claim 1, wherein each secondary winding T1c is connected to the respective output via a respective rectifier D3, wherein each rectifier D3 is oriented to allow current flow in winding T1c when the primary winding T1a is connected to the voltage supply, and to substantially block current flow in the opposite direction.

15. The converter as claimed in claim 1, wherein each secondary winding L1b is connected to the respective output via a respective rectifier D4, wherein each rectifier D4 is oriented to substantially block current flow in winding L1b when the primary winding L1a is connected to the voltage supply, and to allow current flow in the opposite direction.

16. The converter as claimed in claim 1, wherein each output comprises a common output capacitor Cout.

17. The converter as claimed in claim 1, wherein switch S1 is a MOSFET.

18. The converter as claimed in claim 1, wherein winding Tb and capacitor Cs are connected such that they form a resonant circuit in the on-state.

* * * * *